US008914289B2

(12) United States Patent
Ma et al.

(10) Patent No.: US 8,914,289 B2
(45) Date of Patent: Dec. 16, 2014

(54) ANALYZING AND PROCESSING A VERBAL EXPRESSION CONTAINING MULTIPLE GOALS

(75) Inventors: Changxue Ma, Barrington, IL (US); Yan-Ming Cheng, Inverness, IL (US)

(73) Assignee: Symbol Technologies, Inc., Holtsville, NY (US)

( * ) Notice: Subject to any disclaimer, the term of this patent is extended or adjusted under 35 U.S.C. 154(b) by 1054 days.

(21) Appl. No.: 12/639,067

(22) Filed: Dec. 16, 2009

(65) Prior Publication Data
US 2011/0144996 A1    Jun. 16, 2011

(51) Int. Cl.
*G10L 15/22* (2006.01)
*G06F 17/30* (2006.01)
*G06F 17/27* (2006.01)

(52) U.S. Cl.
CPC .......... *G10L 15/22* (2013.01); *G06F 17/30637* (2013.01); *G06F 17/2765* (2013.01)
USPC ....................................................... 704/257

(58) Field of Classification Search
CPC ...................................................... G10L 15/22
USPC ....................................................... 704/257
See application file for complete search history.

(56) References Cited

U.S. PATENT DOCUMENTS

| 6,327,566 | B1 | 12/2001 | Vanbuskirk et al. |
| 7,228,278 | B2 | 6/2007 | Nguyen et al. |
| 7,502,781 | B2 | 3/2009 | Garber et al. |
| 2001/0029452 | A1 | 10/2001 | Chen |

FOREIGN PATENT DOCUMENTS

| EP | 1168304 A1 | 1/2002 |
| EP | 1650744 A1 | 4/2006 |
| WO | 2006107586 A2 | 10/2006 |
| WO | 2009055819 A1 | 4/2009 |

OTHER PUBLICATIONS

International Search Report & Written Opinion mailed on Feb. 23, 2011 for International Application No. PCT/US2010/056852.

*Primary Examiner* — Susan McFadden
(74) *Attorney, Agent, or Firm* — Brian Mancini

(57) ABSTRACT

A method for parsing a verbal expression received from a user to determine whether or not the expression contains a multiple-goal command is described. Specifically, known techniques are applied to extract terms from the verbal expression. The extracted terms are assigned to categories. If two or more terms are found in the parsed verbal expression that are in associated categories and that do not overlap one another temporally, then the confidence levels of these terms are compared. If the confidence levels are similar, then the terms may be parallel entries in the verbal expression and may represent multiple goals. If a multiple-goal command is found, then the command is either presented to the user for review and possible editing or is executed. If the parsed multiple-goal command is presented to the user for review, then the presentation can be made via any appropriate interface including voice and text interfaces.

20 Claims, 5 Drawing Sheets

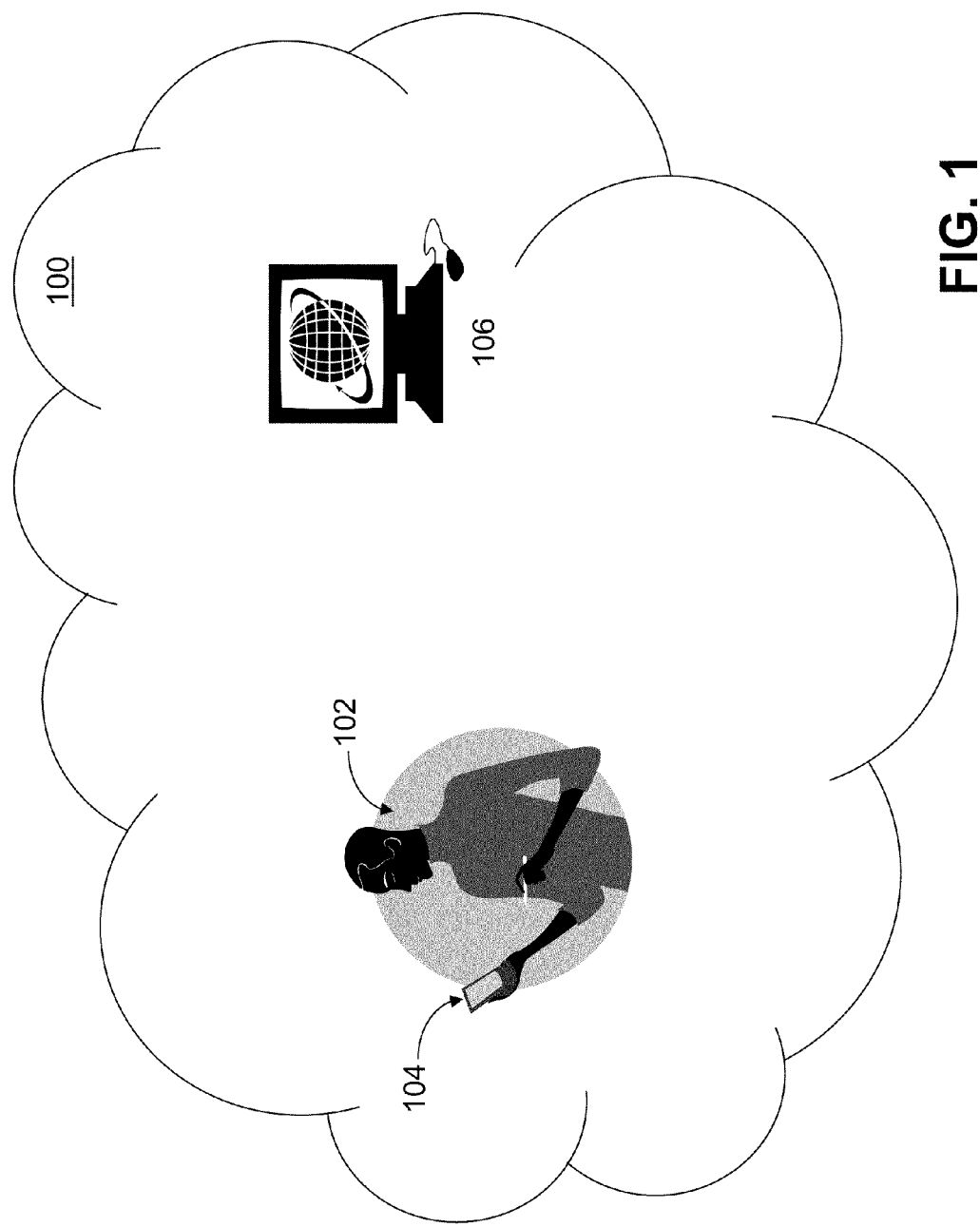

ANALYZING AND PROCESSING A VERBAL EXPRESSION CONTAINING MULTIPLE GOALS

FIELD OF THE INVENTION

The present invention is related generally to computing devices that recognize human speech and, more particularly, to semantic analysis of verbal expressions.

BACKGROUND OF THE INVENTION

Computing devices, either working alone or linked together in a communication network, are becoming increasingly useful to their human users. In many areas, such as searching and information retrieval, computing devices have become so capable that they seem to be able to perform almost any task given to them. The use of this enormous capability is, however, often stymied by the inefficiency of the means available to present a task to the computing device. That is to say, the user interface for specifying a task is often a chief bottleneck for getting a computing device to perform that task.

The occasion sometimes arises where a user wants to direct a computing device to perform a number of similar tasks. For example, the user wishes to add a number of people to a list (e.g., a list of intended recipients of an e-mail). The user can simply add the people one by one, specifying a separate command to add each person. It would be more efficient for the user, however, if he could specify one command that adds all of the people to the list. For purposes of the present discussion, this one command is called a "multiple-goal" task.

Text interfaces are very common tools for directing a computing device to perform a task. Some text interfaces allow a user to specify a multiple-goal task. However, the user may have to correctly handle an intimidating amount of punctuation (e.g., parentheses) and operators to correctly specify the multiple-goal task.

Voice-search interfaces, which perform tasks by executing commands retrieved from task databases searched with voice queries, are becoming more common and are especially desirable when a user's hands or eyes are otherwise occupied and are therefore not available to manipulate a text interface. As just one example, voice-calling interfaces are most useful when the user is driving or when using a cellular telephone with a limited keypad. A voice-search interface gives the user more freedom to formulate his command by searching a task database by using a voice query. However, voice-search interfaces typically have some significant limitations in comparison with text interfaces, especially when presenting complicated tasks to a computing device. A user communicating through an existing voice interface would probably not be able to correctly specify a multiple-goal task at all, given the limitations of existing voice interfaces and the difficulty in correctly specifying an elaborately punctuated command without the benefit of visual feedback.

BRIEF SUMMARY

The above considerations, and others, are addressed by the present invention, which can be understood by referring to the specification, to the drawings, and to the claims. According to aspects of the present invention, a verbal expression is received from a user. The expression is parsed to determine whether or not it contains a multiple-goal command. Specifically, known techniques are applied to extract terms from the verbal expression. The extracted terms are assigned to categories such as "verb" or "noun." The temporal distribution of the terms in the expression is also examined. If two or more terms are found in the parsed verbal expression that are in associated categories and that do not overlap one another temporally, then the confidence levels of these terms are compared. If the confidence levels are similar, then the terms may be parallel entries in the verbal expression and may represent multiple goals. If a multiple-goal command is found, then either the command is presented to the user for review and possible editing, or the command is simply executed.

In the present discussion, a "command" can be a command, a search query, or a response.

If the decision is made to present the parsed multiple-goal command to the user for review, then the presentation can be made via any appropriate interface including voice interfaces and text interfaces. Known methods for editing the presented command can be applied to correct any misunderstandings on the part of the parser.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

FIG. 1 is an overview of a representational environment in which the present invention may be practiced;

DETAILED DESCRIPTION

Figure 2B:
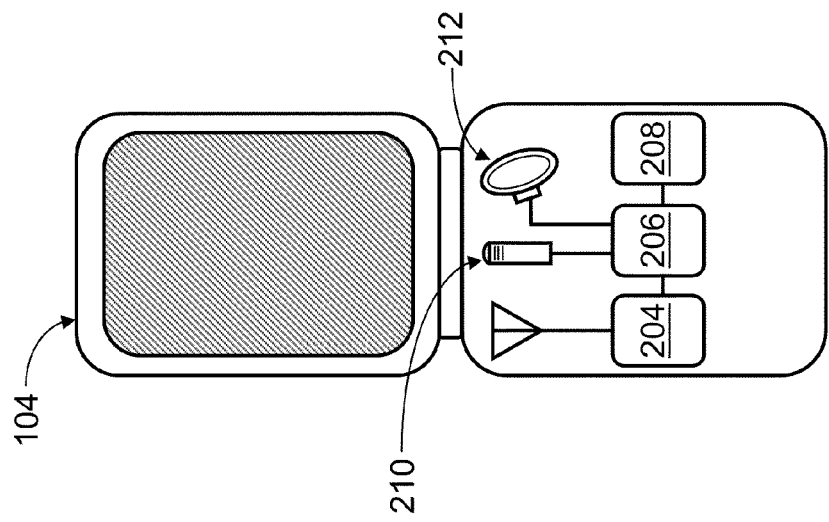
FIGS. 2a and 2b are simplified schematics of a personal electronic device that can receive a verbal expression.

Turning to the drawings, wherein like reference numerals refer to like elements, the invention is illustrated as being implemented in a suitable environment. The following description is based on embodiments of the invention and should not be taken as limiting the invention with regard to alternative embodiments that are not explicitly described herein.

In FIG. 1, a user 102 directs his personal electronic device 104 to perform a command. (Here, "command" can also include a search query or a response to a request for information.) The command may be single-goal or multiple-goal. For whatever reason, the user 102 chooses to speak his command query into the device 104 rather than typing it in. The search results from the verbal-query expression of the user 102 are parsed (either locally on the device 104 or on a remote server 106) to determine whether the expression contains a multiple-goal command. If a multiple-goal command is found, then either the command is presented to the user 102 for review and editing, or the command specified by the expression is executed (again, either locally or remotely). Depending upon the nature of the command, results may be presented to the user 102 via the device 104. The communications network 100 enables the device 104 to access the remote server 106, if appropriate.

If the decision is made to present the parsed multiple-goal command to the user 102 for review, then the presentation can be made via any appropriate interface on the personal electronic device 104 including voice-search interfaces and text interfaces. Known methods for editing the presented command can be applied to correct any misunderstandings on the part of the parser.

Figure 2A:
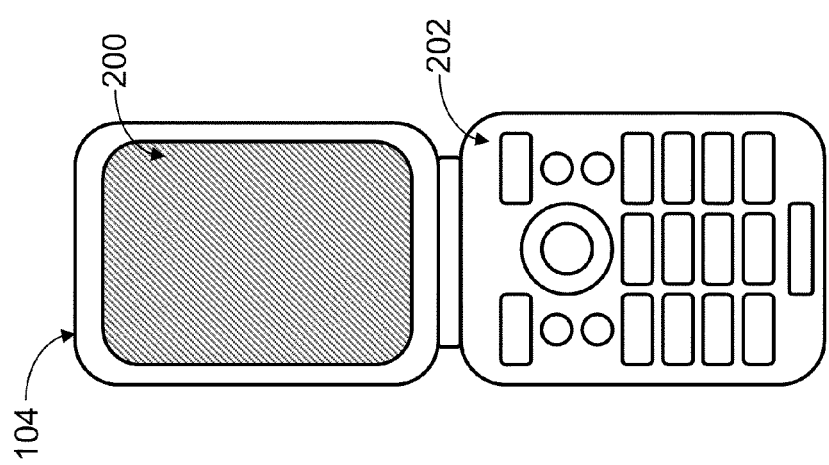

FIGS. 2a and 2b show a personal electronic device 104 (e.g., a cellular telephone, personal digital assistant, or personal computer) that incorporates an embodiment of the present invention. FIGS. 2a and 2b show the device 104 as a cellular telephone in an open configuration, presenting its main display screen 200 to the user 102. Typically, the main display 200 is used for most high-fidelity interactions with the user 102. For example, the main display 200 is used to show video or still images, is part of a user interface for changing configuration settings, and is used for viewing call logs and contact lists. To support these interactions, the main display 200 is of high resolution and is as large as can be comfortably accommodated in the device 104. A device 104 may have a second and possibly a third display screen for presenting status messages. These screens are generally smaller than the main display screen 200. They can be safely ignored for the remainder of the present discussion.

The typical user interface of the personal electronic device 104 includes, in addition to the main display 200, a keypad 202 or other user-input devices.

FIG. 2b illustrates some of the more important internal components of the personal electronic device 104. The device 104 includes a communications transceiver 204, a processor 206, and a memory 208. A microphone 210 (or two) receives the verbal expression from the user 102. A speaker 212 is usually present.

Figure 3A:
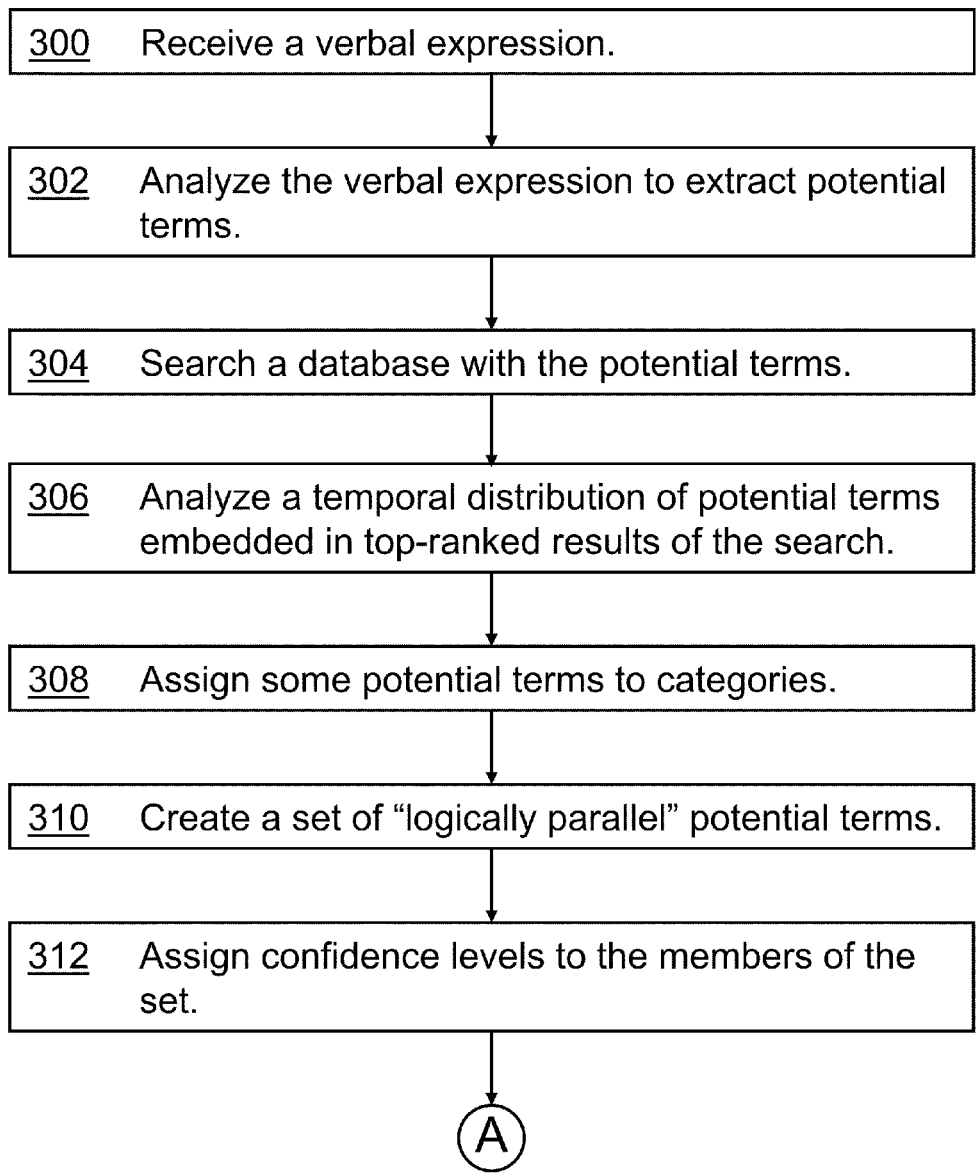
FIGS. 3a and 3b together form a flowchart of an exemplary method for analyzing and processing a multiple-goal verbal expression.
Figure 3B:
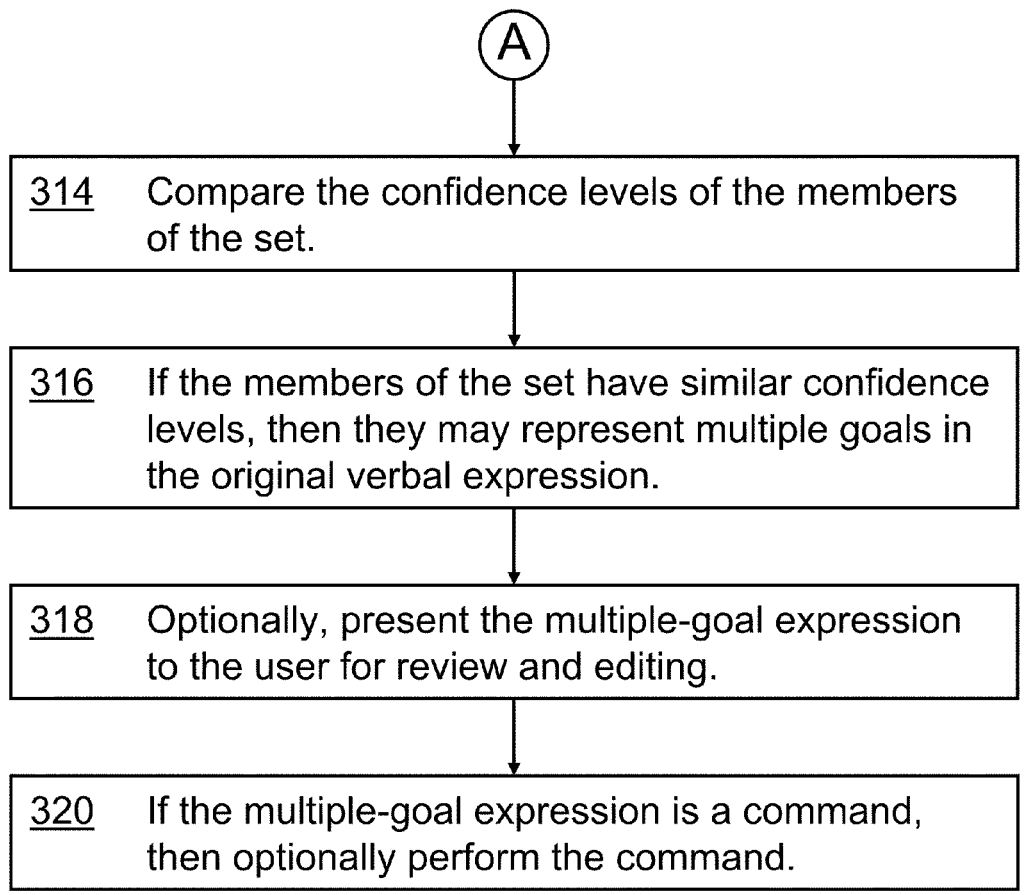
Figure 4:
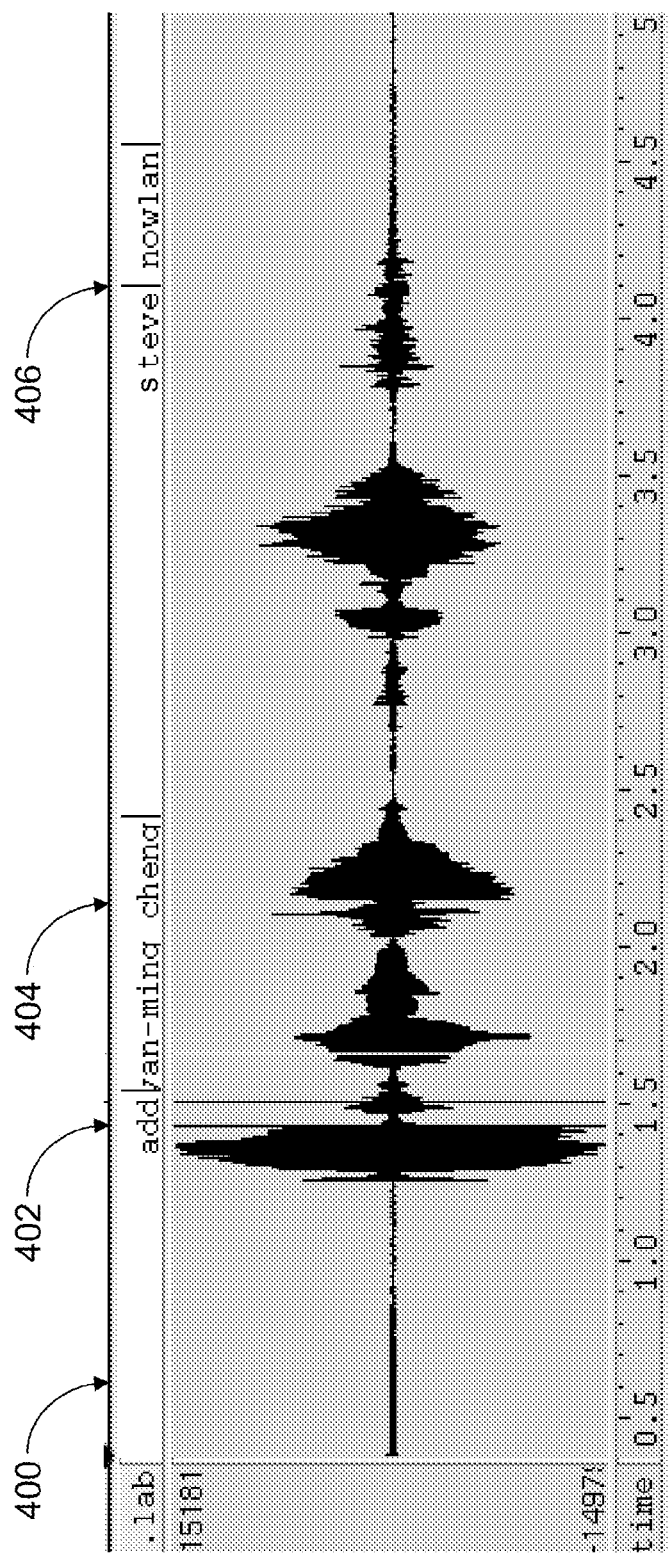
FIG. 4 is a waveform diagram of an exemplary multiple-goal verbal expression.

FIGS. 3a and 3b present an exemplary method embodying the present invention. The method begins at step 300 of FIG. 3a where the personal electronic device 104 receives a verbal expression from the user 102. To help illustrate the concepts in this discussion, FIG. 4 presents a waveform of a sample verbal expression 400. In this example, the user 102 spoke the multiple-goal command "Add Yan-Ming Cheng and Steve Nowlan" (to a list of some sort, possibly a contact list or a list of recipients for an e-mail).

In step 302, the verbal expression 400 is analyzed using any of several possible techniques. For example, lattices of phonemes or words are generated from the waveform of the verbal expression 400, and the phoneme strings or words extracted from the lattices are used as search terms to search a task database containing text items such as commands and names. Because the phoneme lattices contain highly likely phoneme sequences (and the word lattices contain highly likely word sequences) generated from the waveform, allowances are made for variations in speech and for noise in the verbal expression 400, and this database searching may produce some uncertainties including multiple potential interpretations of one or more terms in the verbal expression 400. For purposes of the present discussion, assume that the extraction process produces the following list of possible matches in the database:

(1) Steve Nowlan
(2) Steve Jobs
(3) add
(4) Yan-Ming Cheng
(5) Jackie Chen

Thus, the extraction process confidently recognized the word "add" (that is, only one database match corresponds to this term in the verbal expression 400). However, the extraction process was not too sure about the two name strings, because the extraction process retrieved from the database two possible matches for each of the two name strings.

(In some embodiments, the processing of steps 302 through 316 may be done on a server 106 remote from the personal electronic device 104. The server 106 may have more processing capability than the device 104 and may thus be able to provide a better or a faster analysis.)

In step 304, a database is searched with the potential terms. The results of the search are ranked in terms of possibility of correctness. Some embodiments of the database contain "associational" rules for some of the terms. For example, the database could know that the command word "play" takes the names of media files as its only arguments. Thus, the command word "play" is associated with media-file names as arguments. If the play command were recognized in a verbal expression, then the database search would assign a very low rank to an interpretation of a human's name as an argument to that command.

In step 306 (which in some embodiments is performed in parallel with step 302), the temporal distribution of the potential terms ranked highest in the search results is analyzed. (Only the highest ranked terms are analyzed to prevent the analysis from being cluttered with a number of barely feasible terms.) Note that the analyzed temporal distribution includes all of the potential terms, including alternative database matches for a single term in the original verbal expression 400. The potential terms could overlap in time. In the current example, the analyzed temporal distribution includes all five potential terms listed above. Turning to the exemplary verbal expression 400 of FIG. 4, the extracted term "add" 402 proceeds the extracted first name string 404 (which is actually "Yan-Ming Cheng" but, at this point in the analysis, may also be "Jackie Chen") and the extracted second name string 406 (actually "Steve Nowlan" but potentially "Steve Jobs"). The temporal distribution shows that "Yan-Ming Cheng" and "Jackie Chen" substantially overlap in time (not shown in FIG. 4). Thus, the temporal distribution makes clear that "Yan-Ming Cheng" and "Jackie Chen" are not separate extracted phrases but are alternative interpretations (that is, alternative database matches) of a single phrase in the verbal expression 400.

Step 308 assigns at least some of the potential terms to categories. Different embodiments may use different categories, and different verbal expressions may call for the use of different categories. As discussed above, the database of recognizable terms may also include a categorization of each term, or a different database may be consulted. As one example, the categories can represent parts of speech such as verbs (which may represent command terms), noun phrases (which may represent the arguments of a command), adjectives, logical conjunctions, etc. Noun phrases, for example, may also be sub-categorized based on their meaning: names of human beings, media-file names, etc. Following the example of FIG. 4, the extracted term "add" 402 is recognized as a verb command, while "Yan-Ming Cheng" 404 (which, at this point in the analysis, may alternatively be "Jackie Chen") is a noun phrase, and "Steve Nowlan" 406 (or "Steve Jobs") is another noun phrase. The noun phrases 404, 406 are also recognized as names of human beings. Note that in some embodiments, the interpretation of some terms in the verbal expression 400 may guide the assignment to categories of the remaining terms in the expression 400. Here again is the example of the command verb "play" which should take media-file names as arguments. Potential terms could belong to conflicting categories (e.g., "play" and "Steve Nowlan" belong to unassociated categories because the "play" command cannot take a human name as an argument, while "add" and "Steve Nowlan" are in different, but associated, categories). Other embodiments may simply proceed with the assignment to categories without relying on a partial interpretation of the verbal expression 400. In any case, the listed items are checked to see if they belong to associated categories.

In step 310, a set of "logically parallel" potential terms is created. Potential terms in the verbal expression 400 are considered to be "logically parallel" if they (a) do not substantially overlap one another temporally and if they (b) were assigned to associated categories in step 308. In the example of FIG. 4, the potential terms 404 ("Yan-Ming Cheng" or "Jackie Chen") and 406 ("Steve Nowlan" or "Steve Jobs") do not overlap one another temporally and are both categorized as human names. Thus, they are considered here to be "logically parallel."

(Note that step 310 only takes place when the interpretation of the verbal expression 400 calls for it. If no set of logically parallel potential terms can be extracted from a verbal expression, then that expression is not considered to contain multiple goals.)

Step 312 assigns confidence levels to members of the set of logically parallel potential terms created in step 310. (For purposes of the present discussion, step 312 is shown in FIG. 3a as following step 310, but in some embodiments step 312 is actually performed earlier, possibly in conjunction with the extraction of potential terms in step 302.) As is well known in the art, a "confidence level" is a number that shows how sure the interpretation process is that it has correctly identified a term extracted from the verbal expression 400. The art teaches several ways of assigning confidence levels (e.g., as the logical distance between an extracted phoneme string and a phoneme lattice), and different embodiments can use different methods (as long as a particular embodiment is self-consistent).

In the example of FIG. 4, the interpretation process has no doubt that term 402 is "add," so the confidence level of term 402 is very high. The confidence levels of terms 404 and 406 are somewhat lower as there are two possible interpretations for each of these terms. For purposes of the present discussion, assume that the interpretation of the verbal expression 400 is generally accurate and confident, that is to say, while there is some doubt whether term 404 is "Yan-Ming Cheng" or "Jackie Chen," the processing software is pretty confident that "Yan-Ming Cheng" is the correct term. Similarly, the software is pretty confident that "Steve Nowlan" is the correct interpretation of term 406.

In step 314 of FIG. 3b, the confidence levels of the members of the set of logically parallel terms are compared. Different techniques of comparing the confidence levels may be used; in one embodiment, the difference between the confidence levels is compared to a threshold. As assumed above, the confidence levels of the logically parallel terms 404 and 406 are similar (and high). Based on this comparison, the processing may have extracted a multiple-goal expression from the original verbal expression 400. The multiple goals are the members 404 and 406 of the set of logically parallel terms that have similar confidence levels.

To sum up the results of the analysis so far, the verbal expression 400 has been found to contain the command verb "add" 402 which takes in parallel (i.e., takes as multiple-goals) the two noun-phrase arguments 404 and 406. In the embodiment of FIGS. 3a and 3b, there are two alternatives to consider at this point. In step 318, the multiple-goal expression extracted from the original verbal expression 400 is presented to the user 102 for review and possible editing. In the alternative (also after applying the edits of step 318), the multiple-goal expression is performed in step 320. These alternatives are discussed in turn.

There are several possible reasons for presenting the extracted multiple-goal expression for review by the user 102 in step 318 rather than simply acting upon it. For example, the confidence level of the analysis as a whole may be somewhat low, and it makes sense to give the user 102 the opportunity to correct any interpretive mistakes. Also, the user 102 may not yet be confident with verbally expressing multiple-goal commands, so he may appreciate the safety net of a review.

The extracted multiple-goal expression can be presented to the user 102 in any of a number of ways. For example, the expression may be presented as a text string on the main display screen 200 of the personal electronic device 104. This has the advantage that punctuation can be added to clearly show the format of the multiple-goal expression. The user 102 can then use well known text-editing software to amend the expression as needed. Some users may rely on this editing and intentionally treat the spoken expression 400 as merely a draft that he will work into shape with the text editor.

In some embodiments, the extracted verbal expression can be spoken to the user 102 via the speaker 212 of the personal electronic device 104. Modulation of the spoken expression can be exaggerated to clearly delineate the multiple-goal nature of the extracted expression. Again, the user 102 may choose to edit the expression before allowing it to be performed.

In step 320, the multiple-goal command (as edited, if necessary, in step 318) is performed.

While the above analysis is somewhat intricate, the experience of the user 102 is quite straightforward. It is expected that embodiments of the present invention will allow the user 102 to become comfortable with phrasing and executing multiple-goal commands, thus enabling the user to become more efficient at list processing and at other multiple-goal tasks.

In view of the many possible embodiments to which the principles of the present invention may be applied, it should be recognized that the embodiments described herein with respect to the drawing figures are meant to be illustrative only and should not be taken as limiting the scope of the invention. For example, many useful techniques are available for extracting potential terms, for assigning those terms to categories, and for assigning confidence levels to the potential terms. Therefore, the invention as described herein contemplates all such embodiments as may come within the scope of the following claims and of equivalents thereof.

We claim:

1. A method for analyzing, on a computing device, a verbal expression for multiple goals, the method comprising:
   receiving, by the computing device, the verbal expression for multiple goals, wherein the expression for multiple goals being an expression to perform a plurality of similar tasks;
   analyzing, by the computing device, the verbal expression to extract potential terms;
   searching, by the computing device, a database with the potential terms;
   analyzing, by the computing device, a temporal distribution of potential terms embedded in top-ranked results of the searching to determine if the verbal expression is the multiple-goal expression;
   when the verbal expression is the multiple-goal expression:
   assigning, by the computing device, at least some of the potential terms to categories;
   creating, by the computing device, a set of a plurality of the potential terms, wherein members of the set are potential terms that do not overlap temporally with one another and that have been assigned to categories obeying associational rules;

assigning, by the computing device, confidence levels to the members of the set;

comparing, by the computing device, confidence levels of the members of the set; and if the members of the set have similar confidence levels, then:

presenting, by the computing device, to a user the multiple-goal expression based, at least in part, on the received verbal expression, the multiple goals represented by the members of the set when the confidence levels of the members of the set are low; and executing, by the computing device, the multiple-goal expression by performing the plurality of similar tasks.

2. The method of claim 1,
wherein
receiving the verbal expression includes receiving the verbal expression from a user of the personal electronic device.

3. The method of claim 1,
wherein receiving the verbal expression includes receiving the verbal expression from a server via a communication link.

4. The method of claim 1 wherein the verbal expression is generated by one of:
a search query, a command, and a response.

5. The method of claim 1 wherein a category is selected from the group consisting of: a command, a noun, an adjective, a preposition, an adverb, a conjunction, and an article.

6. The method of claim 1 wherein a confidence level of a potential term is based, at least in part, on a measure of a distance between a phoneme string of the potential term and a phoneme lattice.

7. The method of claim 1 wherein members of the set have similar confidence levels if each pair-wise difference of confidence levels of members of the set is less than a threshold.

8. The method of claim 1 wherein the multiple-goal expression is presented to the user as an element selected from the group consisting of: a text expression and a verbal expression.

9. The method of claim 1 further comprising:
receiving from the user an acceptance of the presented multiple-goal expression; and
if the presented multiple-goal expression is a command, then performing that command.

10. The method of claim 1 further comprising:
receiving from the user an amendment to the presented multiple-goal expression;
amending the presented multiple-goal expression based, at least in part, on the user's amendment; and
if the amended multiple-goal expression is a command, then performing that command.

11. A personal electronic device comprising:
a microphone configured for receiving a verbal expression for multiple goals from a user of the personal electronic device, wherein the expression for multiple goals being an expression to perform a plurality of similar tasks,
an output interface; and
a processor operatively coupled to the microphone to the output interface and configured for analyzing the verbal expression to extract potential terms, for searching a database with the potential terms, for analyzing a temporal distribution of potential terms embedded in top-ranked results of the searching to determine if the verbal expression is the multiple-goal expression, for assigning at least some of the potential terms to categories when the verbal expression is the multiple-goal expression, for creating a set of a plurality of the potential terms, wherein members of the set are potential terms that do not overlap temporally with one another and that have been assigned to categories obeying associational rules, for assigning confidence levels to the members of the set, for comparing confidence levels of the members of the set, and for, if the members of the set have similar confidence levels, then: presenting to the user, via the output interface, the multiple-goal expression based, at least in part, on the received verbal expression, the multiple goals represented by the members of the set when the confidence levels of the members of the set are low and executing the multiple goal expression by performing the plurality of similar tasks based on user feedback or executing the multiple goal expression by performing the plurality of similar tasks.

12. The personal electronic device of claim 11 wherein the verbal expression is generated by one of: a search query, a command, and a response.

13. The personal electronic device of claim 11 wherein a category is selected from the group consisting of: a command, a noun, an adjective, a preposition, an adverb, a conjunction, and an article.

14. The personal electronic device of claim 11 wherein a confidence level of a potential term is based, at least in part, on a measure of a distance between a phoneme string of the potential term and a phoneme lattice.

15. The personal electronic device of claim 11 wherein members of the set have similar confidence levels if each pair-wise difference of confidence levels of members of the set is less than a threshold.

16. The personal electronic device of claim 11:
wherein the output interface comprises a speaker; and
wherein the processor is further configured for presenting the multiple-goal expression as a verbal expression via the speaker.

17. The personal electronic device of claim 11:
wherein the output interface comprises a display screen; and
wherein the processor is further configured for presenting the multiple-goal expression as a text expression via the display screen.

18. The personal electronic device of claim 11 wherein the processor is further configured for:
receiving from the user an acceptance of the presented multiple-goal expression; and
if the presented multiple-goal expression is a command, then performing that command.

19. The personal electronic device of claim 11 wherein the processor is further configured for:
receiving from the user an amendment to the presented multiple-goal expression;
amending the presented multiple-goal expression based, at least in part, on the user's amendment; and
if the amended multiple-goal expression is a command, then performing that command.

20. A server comprising:
a network communications interface configured for receiving a verbal expression for multiple goals, wherein the expression for multiple goals being an expression to perform a plurality of similar tasks; and
a processor operatively coupled to the network communications interface and configured for analyzing the verbal expression to extract potential terms, for searching a database with the potential terms, for analyzing a temporal distribution of potential terms embedded in top-ranked results of the searching to determine if the verbal expression is the multiple-goal expression, for assigning at least some of the potential terms to categories when the verbal expression is the multiple-goal expression, for creating a set of a plurality of the potential terms, wherein members of the set are potential terms that do not overlap temporally with one another and that have been assigned to categories obeying associational rules, for assigning confidence levels to the members of the set, for comparing confidence levels of the members of the set, and for, if the members of the set have similar confidence levels, then either: transmitting, via the network communications interface, the multiple-goal expression based, at least in part, on the received verbal expression, the multiple goals represented by the members of the set when the confidence levels of the members of the set are low and executing the multiple goal expression by performing the plurality of similar tasks based on user feedback or executing the multiple goal expression by performing the plurality of similar tasks.

* * * * *